United States Patent [19]

Huang

[11] Patent Number: 5,452,394

[45] Date of Patent: Sep. 19, 1995

[54] PRACTICAL CIRCULAR-POLARIZATION MAINTAINING OPTICAL FIBER

[76] Inventor: Hung-Chia Huang, Apt. 404, No. 4, 83 Lane, Jiang Ning Rd., Shanghai, China

[21] Appl. No.: 201,405

[22] Filed: Feb. 24, 1994

[51] Int. Cl.⁶ .............................................. G02B 6/10
[52] U.S. Cl. .................................... 385/123; 385/11; 385/12; 385/50
[58] Field of Search ............... 385/123, 11, 12, 50, 385/124, 125, 126, 127

[56] References Cited

U.S. PATENT DOCUMENTS

| | | | |
|---|---|---|---|
| 4,515,436 | 5/1985 | Howard et al. | 385/11 X |
| 4,943,132 | 7/1990 | Huang | 385/11 |
| 5,029,961 | 7/1991 | Suzuki et al. | 385/50 |
| 5,096,312 | 3/1992 | Huang | 385/11 |

*Primary Examiner*—Rodney B. Bovernick
*Assistant Examiner*—Phan T. H. Palmer
*Attorney, Agent, or Firm*—Birch, Stewart, Kolasch & Birch

[57] ABSTRACT

The present invention is directed to a circular-polarization maintaining fiber structure, containing a stress-applying filament whirling around a central core. The fiber is fabricable by any of the existing fiber-making methods. The fiber is capable of maintaining circular polarizations of light, segments of such fiber can be easily spliced by lining up the cores only, and the fiber tolerates well bending and random perturbations likely to occur in practice. The invention is immediately applicable to fiber gyroscope and other interferometric architectures, to a variety of sensors, and to coherent optical transmission.

10 Claims, 6 Drawing Sheets

PRACTICAL CIRCULAR-POLARIZATION MAINTAINING OPTICAL FIBER

BACKGROUND OF THE INVENTION

1. Field of the Invention

This invention relates to a polarization-maintaining fiber, a specialized optical fiber, polarization optics in a single-mode optical fiber, a fiber gyroscope, fiber-optic interferometers, particularly Sagnac interferometer, fiber-optic sensors, cohererent optical transmission, etc.

2. Description of the Related Art

Guided-wave transmission systems often require that the transmission is in one stable mode. In a conventional single mode optical fiber, because of the possible existence of two degenerate modes, perturbations of various kinds, such as bending, pressure, random twisting, etc., will cause conversions and reconversions of power to occur between the two modes, with the result that light transmission in a selected mode, or in a preferred polarization, becomes annoyingly unstable.

Currently available "polarization maintaining" optical fibers are capable of maintaining a linearly polarized mode only, and only when the orientation of the linear SOP (State of Polarization) is always directed along one of the two principal axes of the fiber. If the linearly polarized light deviates but slightly from the principal axis, the so-called polarization-maintaining fibers no longer maintain the polarization of the propagating light, which actually undergoes all variations of the SOP in a half beat length.

While linear-polarization maintaining optical fibers have achieved admirable successes over the past years, and have found a variety of applications in fiber-optic systems, a major difficulty exists in that all such fibers require alignment of the birefringence axes of fiber elements in order to be jointed or spliced. In some simpler applications, the aligning of the principal axes can be aided by the technique of light power monitoring, i.e. assuming that two fiber elements are satisfactorily aligned when the transmitted light power attains an optimum value. However, in certain other applications which involve the interference of two or more propagating light beams, the power-monitoring method will not work. One example of this case is provided by a hi-bi (high birefringence) Sagnac fiber loop in a gyroscope architecture, for which the final closing of the loop by splicing the last two fiber ends poses a yet unsolved "hard-nut" problem because of the existence of two counter-propagating beams in the same loop. See Huang Hung-chia, "Passive polarization-controlled all-fiber-gyroscope and other interferometric architectures", Fiber and Integrated Optics, Vol. 12, No. 1, pp. 21-29, (1993).

Birefringent optical fibers which are capable of maintaining a circularly polarized light appear to be an ideal medium for the obvious reason that segments of such fiber can be jointed or spliced easily without the need of a special technique of aligning. In fact, the circular polarization maintaining fibers do not possess such things as the principal axes. Joining or splicing two segments of circular-polarization maintaining fiber is just as simple as the case of conventional optical fibers, for which only the cores on both sides of the joint are required to be aligned.

The advantageous feature possessed by an optical fiber transmitting a stable circularly polarized light was early recognized about one and a half decades ago, when the initial attempts to make linear-polarization maintaining fibers just started. R. Ulrich and A. Simon, "Polarization optics of twisted single mode fibers", Appl. Optics, vol. 18, pp. 2241-2251 (1979). L. Jeunhomme and M. Monerie, "Polarization maintaining single-mode fiber cable design". Electron. Lett. vol. 16, No. 24, pp. 921-922 (1980)

Over the past years, while the art of making linear polarization maintaining fibers has achieved admirable successes in producing several practical fiber versions, notably the PANDA, the BOW-TIE and the elliptical-cladding fibers, assiduous efforts in the search for a practical fiber transmitting circular polarized eigenmodes have not yet made any real advance.

The method early adopted to produce a circular polarized eigen-mode in fiber is to sufficiently twist a fiber of the conventional version. The attempt did not succeed because the necessary twist rate was found to be impractically high, so that the fiber would crack before the twist rate approached the required high value. A. J. Barlow and D. N. Payne, "Polarization-maintainance in circularly birefringent fibers", Electron. Lett., vol. 17, No. 11 pp. 388-389. Primarily for the technical need of a rotation sensor or gyroscope, a special "spin and draw" machine was early devised to draw a circular-polarization maintaining fiber. F. Gauthier et al, "Attempts to draw a circular polarization preserving fiber", Proc. Int. Cong. Fiberoptic Rotation Sensors", MIT, Cambridge, pp. 196-200 (November 1981). Despite all of these efforts, early attempts to fabricate circularly birefringent fibers by spinning the preform resulted in low birefringent spun fibers. Meanwhile, the early need for realizing coherent optical transmission did prompt an experimental study of the feasibility of twisted fiber to transmit a stable circularly polarized light over a comparatively long length of the fiber line. S. Machida, "Polarization preservation in long-length twisted single-mode optical fibers", Trans. IECE of Japan, vol. E65, No. 11, pp. 642-647 (November 1982). While valuable experimental data were obtained through comparatively extensive experimentation, the objective of realizing coherent transmission with the aid of twisted fiber remains unfulfilled.

A more recent approach to secure a circularly polarized eigen-mode in guided light transmission is to make use of, essentially, the geometrical effect of a specialized fiber with a helical core. M. P. Varnham et al, "Design of helical core circularly birefrigent fibers", Proc. OFC, p. 68, Poster Paper TUL 20 (1986). R. D. Birch, "Fabrication and characterisation of circularly birefringent helical fibres", Electron. Lett. vol 23, No. 1, pp. 50–51, (1987). The novelty of the idea of making of a helical-core fiber is attractive, but still, application of such a specialized fiber in a practical system poses a number of problems. Because of the helical path of the core, the diameter or transverse dimension of the fiber is necessarily larger than that of the standard fiber versions, and this is an unfavorable feature in many applications. But more importantly, the special techniques of injecting a beam of light into the helical core, and of joining or splicing segments of such fibers into a line, are by far inconvenient to be used in practice.

But the effort of searching for a fiber of high circular birefringence has never discontinued. In parallel with the helical-core fiber, there evolved in the literature and patent documents a family of so-called circularly form-birefringent fibers whose common working principle is to generate a circular birefringence by way of twisting an intentionally made azimuthal-dependent index distribution of the core. Such fibers are also called twisted "multi-core" fibers, embracing a variety of fiber versions with different index patterns of the core, with the names of "SPIRAL" fiber for one-core lobe, "TWISTED-CROSS" or "CLOVER-LEAF" fiber for four-core lobes, "OCTOPUS" fiber for eight-core lobes, etc. R. Romaniuk and J. Dorosz, Proc. SPIE 403, p. 35, (1983). Y. Fujii and C. D. Hussey, "Design considerations for circularly form-birefringent optical fibers", IEE Proc., vol. 133, Pt.J, No. 4, pp. 249–255 (1986). C. Roberto, "Circularly birefringent optical fibres: new proposals", Opt. & Quantum Electron. vol. 21, pp. 35–46 (1989). C. G. Someda, Italian Patents Numbers 41584A/85 (26 Jul. 1985) and 41638A/86 (16 Dec. 1986). Despite their high academic interest, the core index patterns in this family of fibers are so sophisticated that technologically such fibers are difficult, if not impossible, to fabricate. The only published information about an actually fabricated specimen is the one lobe "SPIRAL" fiber, which closely resembles a helix fiber. The multi-core fibers do not appear to be useful from a practical viewpoint, inasmuch as the launching of light into the fiber and the joining or splicing of fiber segments would pose severe problems for the very sophisticated configuration of the fiber-core design.

SUMMARY OF THE INVENTION

The present invention involves the discovery of novel fiber structure capable of generating circular birefringence between the right-handed circular eigen-mode and the left-handed circular eigen-mode existing in the fiber. The capability of maintaining circular-polarization is almost self-explanatory by an intuitive examination of the invented fiber structure, which consists of a stress-applying filament whirling around an axially straight central core. Inherent in the circular polarization preserving behavior of the invention is the very desirable feature that segments of the fiber can be connected or spliced simply by making the cores on both sides of the joint align, eliminating the difficult task of aligning the principal axes during joining fibers to maintain linear polarization. Other advantageous features of the invention include its good tolerance of bending and other perturbations likely to occur in fiber-optic systems.

The invention is directed to a fiber having a straight line core on the axis, like a conventional optical fiber, except that there is a stress-applying filament whirling around the core. The required stress-induced linear birefringence is provided by the stress-applying filament, producing a built-in stress whose direction whirls around the fiber core.

An invention is useful only when it is fabricable, and in a not too complicated way. The fiber of the present invention can be easily realized by using any of the existing fiber-making facilities. The required preform for the invention differs in no way from an ordinary preform for drawing conventional single-mode optical fiber, except that in the present case a stress-applying rod is put off-axis inside the otherwise conventional preform. When such a preform spins in the process of fiber drawing, a special form of fiber is produced, according to the present invention. A built-in whirling stress-filament applies an azimuthally-varying stress on the core along the fiber length, thus producing a circular birefringence. While the stress-filament whirls around the core, the core itself is being spun, and this enhances the over-all circular-polarization maintaining effect. For the sake of simplicity, and in order to make a clear distinction between the present invention and the many previous fiber versions attempting to secure circular-polarization maintaining, the novel fiber disclosed in this document will be called the "SCREW" fiber.

A number of SCREW fiber specimens have been made by the inventor using simple home-made facilities. Experimental data confirms all of the predicted characteristics. Circular hi-bi (high-birefringence) is easily achieved (circular beat length is about 3 mm or shorter).

The experiment shows that splicing segments of the SCREW fiber is just as simple as in the case of conventional single-mode fibers, for which it is only required that the cores on both sides of the joint be placed in line. The whirling stress-filaments in the successive segments need not be continuous at a joint, because an off-set of the following filament will result in a phase shift of the travelling light at the joint, but will not change its circular SOP.

The experiment also shows that the SCREW fiber tolerates bending and other forms of perturbations, as will be described in the following detailed description of the invention.

The invented SCREW fiber is expected to find immediate applications in many important R&D areas in fiber optics. Preferred embodiments include the all-fiber gyroscope and other interferometric architectures, the variety of fiber sensors, coherent transmission systems (coherent CATV, for example), among others.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE INVENTION

Figure 1:
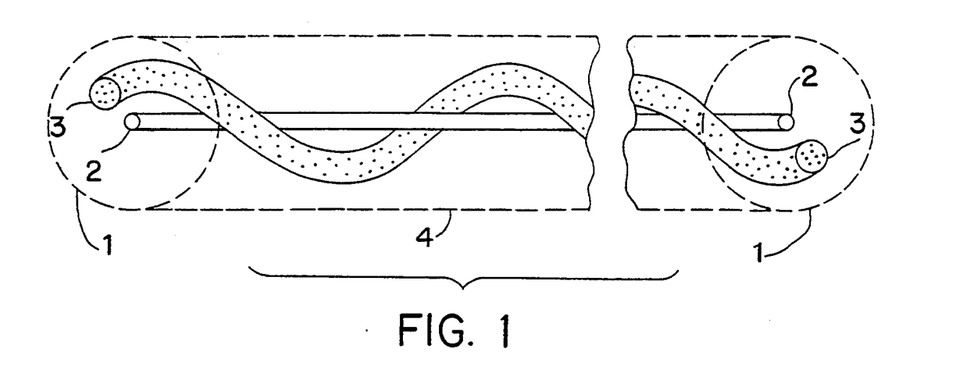
FIG. 1 is a schematic diagram of the invented circular-polarization maintaining fiber involving one whirling stress-applying filament.
Figure 2:
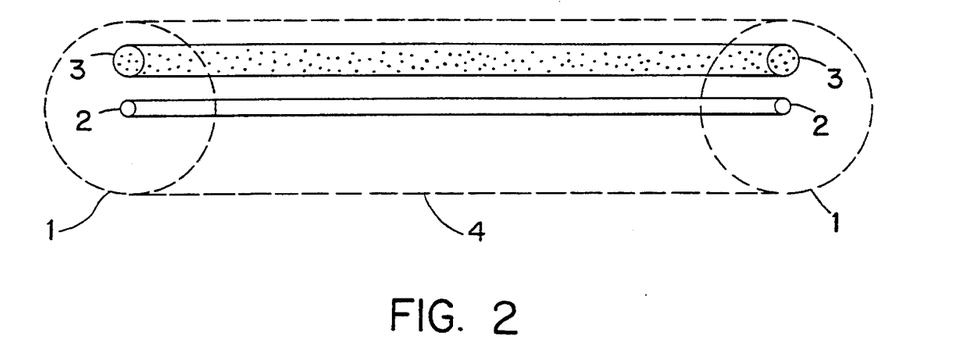
FIG. 2 shows the preform which spins while the circular-polarization maintaining fiber is being drawn.

The novel wave-guiding structure of the present invention is depicted as a greatly enlarged configuration shown in FIG. 1. In the figure, the numeral 1 denotes cross-section of the circular-polarization maintaining fiber, 2 is the core being placed straight along the fiber axis, 3 is a stress-applying filament whirling around the fiber core, and 4 denotes a length of the fiber. Such a complicated-looking fiber structure can actually be fabricated by spinning a special preform as shown in FIG. 2, in which the numeral 1 denotes cross-section of the preform, 2 is the core-rod placed co-axially within the preform, 3 is a straight but off-axis stress-rod placed in parallel with the core-rod, and 4 denotes a length of the preform. FIG. 2 also denotes a greatly enlarged configuration of a fiber drawn from the described preform in the conventional way, i.e., drawing fiber from preform straightforwardly, without spinning.

As indicated above, for the sake of simplicity and in order to make a clear distinction between the present invention and the many previous fiber versions attempting to maintain a circular SOP of light, the invented fiber shown in FIG. 1 is called a SCREW fiber. That a SCREW fiber is capable of maintaining a circular SOP of light can be easily understood by physical reasoning or intuition. The mechanism to produce eigen-modes of circular SOP is almost self-explanatory by a quick glance of FIG. 1. It is well-known in fiber optics technology that birefringence of the polarization modes can be induced in a fiber either by geometrical effect, or by stress effect, or both. Generally, the stress induced birefringence far exceeds the geometrical birefringence. That is why the several established polarization maintaining fibers all make use of the stress effect as the major source for high birefringence. For the presently available "Polarization Maintaining" fibers, notably the Panda, the Bow-Tie, and the elliptical-cladding fibers, the so-called "polarization maintaining" refers to the capability of maintaining a linear SOP of light. In each linear polarization maintaining fiber, there are two exactly identical stress-applying filaments or regions, symmetrically placed on opposite sides of the core, thereby inducing a stress on the core whose direction favors a linear birefringence. It is therefore easy to see by analogy that a circular-polarization maintaining fiber, if realizable, needs to have a built-in stress whose direction varies azimuthally along the fiber length. The present invention makes use of the inventor's discovery that this kind of stress can actually be produced by an off-axis stress-applying filament whirling around the core, like that shown in FIG. 1.

The physical principle underlying the present invention appears simple, however, an exact mathematical treatment of the problem concerned is somewhat complex. As the geometrical theory of light does not appear to work, the inventor attempted to adopt a microwave approach to solving this highly irregular boundary-value problem with the aid of the coupled mode theory. Huang Hung-chia, MICROWAVE APPROACH TO HIGHLY IRREGULAR FIBER OPTICS, to be published by the John Wiley & Sons, Inc., New York. ISBN 0-471-31023-9. In the modal theory, the eigen-mode approach is preferred when the set of eigen-modes pertaining to the actual wave-guiding structure is available, but this is not the case for the complex configuration shown in FIG. 1. It is thus advantageous to adopt the coupled-mode approach for a phenomenological solution.

We start to solve the coupled mode equations for the local modes, which are chosen to be, the normal modes pertaining to the fiber in its unspun state, whose configuration can be seen from FIG. 2. In the actual single-mode fiber involving a whirling filament, the two local modes $W_1$ and $W_2$ satisfy the coupled mode equations:

$$dW_1/dz = -j(\beta - \Delta\beta/2)W_1 + cW_2 \qquad (1)$$

$$dW_2/dz = -cW_1 - j(\beta + \Delta\beta/2)W_2 \qquad (2)$$

in which $\beta = (\beta_1 + \beta_2)$, $\Delta\beta = (\beta_1 - \beta_2)$, and c (the coupling coefficient) is a proportional to the spinning rate $\tau$, i.e., $c = \xi\tau$, where $\xi$ is a proportionality factor dependent of the stress distribution in a given geometrical configuration of fiber.

The eigen-modes $E_1$ and $E_2$ are related to the local modes $W_1$ and $W_2$ by the transformation:

$$E_1 = \cos\psi W_1 - j\sin\psi W_2 \qquad (3)$$

$$E_2 = -j\sin\psi W_1 + \cos\psi W_2 \qquad (4)$$

where $E_1$ and $E_2$ refer to eigen modes in the actual fiber, and $$\psi = \tfrac{1}{2} arctg(2c/\beta) \qquad (5)$$

The eigen-modes can be thus derived by solving Eqs. (1) and (2) with the aid of Eqs. (3) and (4) to yield:

$$E_1 = A_1 exp\{-j(\beta - g)z\} \qquad (6)$$

$$E_2 = A_2 exp\{-j(\beta + g)z\} \qquad (7)$$

where $A_1$ and $A_2$ denote amplitudes of the eigen-modes $E_1$ and $E_2$, respectively, and $$g = [c^2 + (\Delta\beta/2)^2]^{\frac{1}{2}} \qquad (8)$$

From Eqs. (6), (7) and (8), the beat-length of the actual fiber can be expressed as $$L_B = \frac{L_b}{\xi [1 + 4(L_b/L_s)^2]^{\frac{1}{2}}} \qquad (9)$$

where $L_B$ and $L_b$ are beat lengths of the actual fiber and of the reference (unspun) fiber respectively, $L_s$ is the spinning pitch, and $\xi$, as described before, is a stress-dependent factor.

The concept and physical principle underlying the invention being clear, the inventor prompted an attempt to design and to actually make the conceived all-novel fiber-optic structure.

The initial design of a cross-sectional form of the conceived circular-polarization maintaining fiber is just as simple as is shown in FIG. 1. It looks like an one-eyed Panda, which is to be made to spin to produce the circular polarization maintaining property. The design of the invention, or SCREW fiber, is actually simpler than the case of linear polarization maintaining Panda fiber. The latter has two eyes placed symmetrically on opposite sides of the central core. Slight asymmetry of the two eyes with respect to the central core will cause substantial degradation of the Panda fiber's linear polarization maintaining behavior. The one-eyed Panda is an asymmetrical cross-sectional configuration itself, in which the placement of the one eye, or the single stress-applying filament, is by far less restrictive. For a SCREW fiber, the distance between the single stress-filament and the core is optimally chosen from technological considerations, subject to the requirement of low loss and certain other factors. To simplify the preform design of the invention, it is possible to make use of the established design frame-work for the Panda fiber with one of its two eyes taken out.

Fabrication of the fiber preform of the invention can be easily realized with the aid of any of the existing methods, for example, the method of burying a stress rod through a drilled off-axis hollow cylinder in parallel with the axis, or the method of filling the stress-rod and the core-rod, together with a number of dummy glass rods, all in a bigger glass tubing, exactly in the same way as making a Panda fiber or a Panda-like fiber like the linear polarization preserving Corguide. Substantial simplication in fabricating a one-eyed Panda preform is an unique advantage of the invention.

The versatile MCVD method supplemented by the gas-etching technique, which successfully produces the well-known Bow-Tie fiber, is equally useful in making a specialized preform for the present invention. The making of a Bow-Tie preform consists essentially of four steps, e.g., depositing $B_2O_3$—$SiO_2$, gas-etching with flourine, depositing $GeO_2$—$SiO_2$ and collapsing. In making a preform for the invention, the SCREW fiber, a second gas-etching step is introduced to remove one of the remained two sectors after the first gas-etching step and before the step of depositing of the $GeO_2$. The resulting preform after collapse is likewise suitable to be spun afterwards to yield the invented SCREW fiber. At any cross-section of the fiber, the structural configuration is no more a bow-tie, but a fan-shaped stress-filament off-axis with respect to the core.

Figure 3:
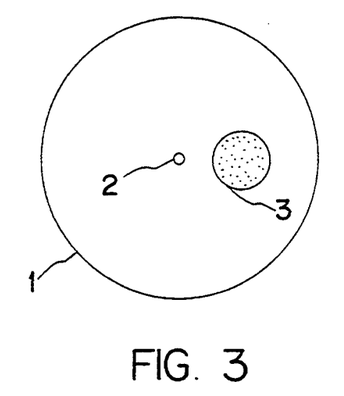
FIG. 3 is a designed cross-section of the invented circular-polarization maintaining fiber.
Figure 4:
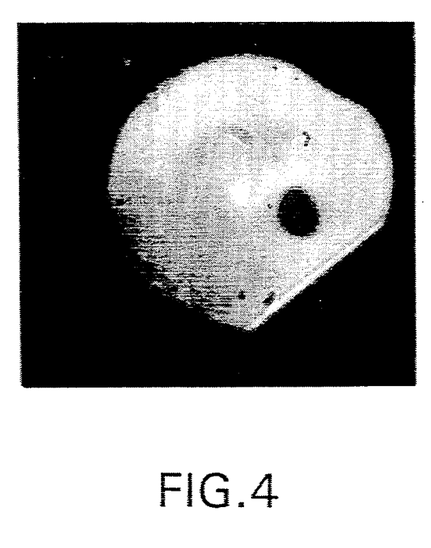
FIG. 4 is microscopic cross-sectional view of a fabricated fiber specimen according to the design.

FIG. 4 is a microscopic cross-sectional view of a fiber specimen of the invention, fabricated according to the simple design in FIG. 3. In FIG. 4, the fiber diameter is about 110 micron, with a core diameter of about 4.5 micron, and is single mode at 0.6328 micron. The inventor also attempted using the MCVD method supplemented by gas-etching technique to make preform and fiber of the invention, and found that this method also works.

Figure 5:
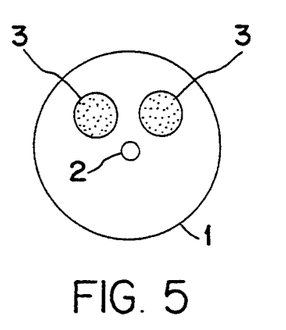
FIG. 5 shows a circular-polarization maintaining fiber involving two appropriately placed whirling stress-filaments.

The one stress-filament structure is the simplest of the several possible structures for the invention. FIG. 5 shows a second possible structure which contains two stress-filaments. Different from a Panda fiber, the two stress-filaments are not colinear with the core, but are so placed that a line joining one stress-filament and core is perpendicular to the line joining the second stress-filament and core. The reason of using such a peculiar placement of the two stress-filaments in FIG. 5 is to eliminate, or to greatly reduce, the residue intrinsic linear birefringence of the two-filament version of the invention, thus preserving more effectively the transmission of light of circular SOP.

Figure 6:
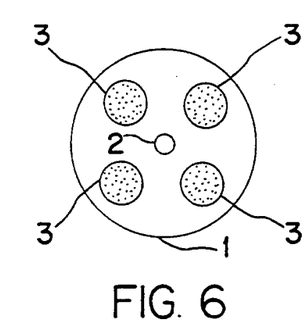
FIG. 6 shows a circular-polarization maintaining fiber involving four appropriately placed whirling stress-filaments.

A four-filament version of the invention is shown in FIG. 6, whose placement of the four filaments aims at further reducing the residue intrinsic linear birefringence for enhancement of the circular-polarization maintaining behavior of the invention. In FIGS. 3, 5 and 6, the numerals 1, 2 and 3 have the same meanings as previously described in connection with FIGS. 1 and 2. Extension can be made, in principle, to include more stress-filaments in a fiber, so long as the placement of the multi-filaments is to get rid of the residue intrinsic linear birefringence to the greatest extent. In practice, however, fabrication of such sophisticated versions of fiber becomes technologically more and more difficult.

Initial data achieved by the inventor's own experiments on several fabricated fiber specimens (single mode at 0.6328 micron) are encouraging, as shown by the set of curves in FIGS. 7–12. In all the figures, the scale of the x axis is 2 sec/cm, allowing a free-hand manual rotation of the analyzer for a few turns in a few seconds. The scale of the y axis is 0.05 v/cm. While the reading on the y axis can be easily calibrated in terms of power, this calibration is relatively unimportant in view of our present interest in the SOP behavior of the fiber under test. The bottom horizontal line, or the x axis, is the dark line drawn by the x-y recorder's pencil when light is cut off.

Figure 7:
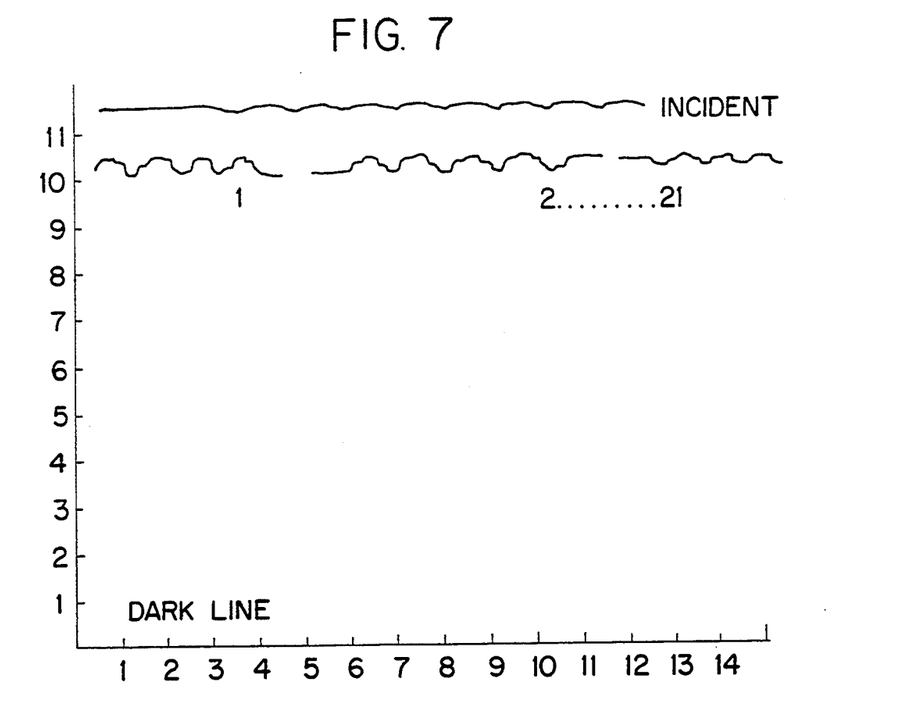
FIG. 7 is the experimental result showing that the circular SOP is maintained in the fabricated specimen irrespective of the length of fiber.

In FIG. 7, the upper curve shows the SOP of light incident onto the input end of the fiber under test. It is practically a circular SOP. The irregular ripples along this curve is mainly due to imperfection of the analyzing prism and its mechanical set-up. Lower curves denote the x-y recorded SOP of light emerging from the far end of a piece of the invented fiber a few meters long, which is successively cut (each time by a few millimeters) to become slightly shorter and shorter. The numerals 1, 2 . . . 21 denote the SOP behavior of the tested fiber specimen having been cut once, twice, and up to about twenty times. The almost identity of the SOP curves (only 3 of the sequence of about 20 curves are shown in FIG. 7) is an evidence that the fiber specimen does possess an eigen-mode of circular SOP. The $\lambda/2$ prism placed in-between the source and a $\lambda/4$ prism is then turned by an angle of $\pi/4$ to reverse the circular SOP from right to left, or vice versa. Similar SOP curves for the fiber specimen through successive cuttings are produced by the x-y recorder, confirming the existence in the fiber a pair of eigen-modes of right and left circular polarizations.

Figure 8:
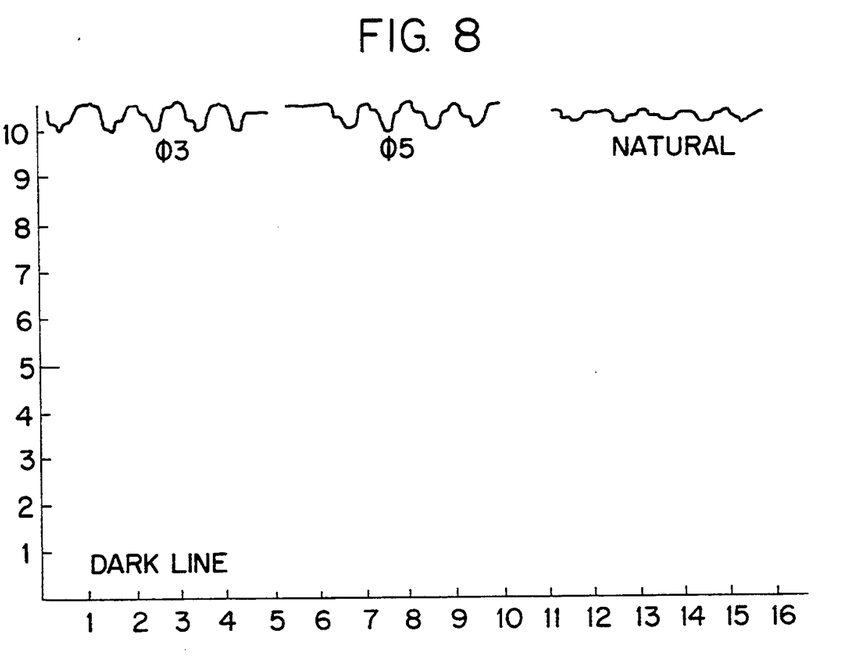
FIG. 8 is the experimental result showing that the circular SOP is maintained when the fabricated specimen of fiber is bent or coiled with a successively reduced radius of curvature.

FIG. 8 shows the effect of bending on the SOP behavior of the fiber specimen. A piece of fiber specimen a few meters long is coiled somewhere along its length into a coiling form of different small diameters. The mark $\phi 3$ below the curve denotes a coiling of 3 centimeter diameter, and $\phi 5$, of 5 centimeter diameter. The right-most curve denotes the SOP of the fiber specimen placed completely naturally, without being coiled somewhere. These initial experimental data show that the invented SCREW fiber tolerates-a bending of comparatively small radius of curvature, when it transmits light of circular SOP.

Figure 9:
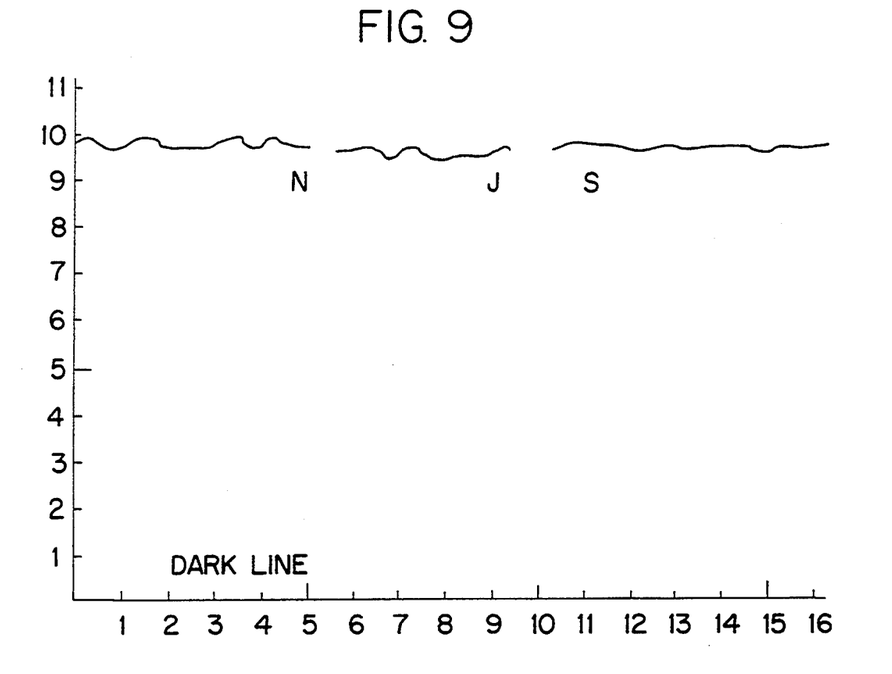
FIG. 9 is the experimental result showing that the circular SOP is maintained at a splice of two fiber-segments whose stress-filaments, not being required to be continuous at the joint, whirl around the core in the same sense.

FIG. 9 provides the experimental data which confirm the inventor's intuitive prediction that the joining or splicing of two segments of the invented SCREW fiber will only cause a phase change of the circularly polarized light passing the joint, but will not affect the SOP of light, which still keeps its circular SOP. The letter N indicates the SOP curve for the emerging light from the far end of one or the other fiber segment before joining or splicing. The letter J indicates the SOP curve when the two fiber segments are cascaded end-to-end, but not spliced together. The letter S indicates the SOP curve of the emerging light after the two fiber segments are spliced together to form a single piece of fiber. When segments of the invented Screw fiber are to be joined or spliced, only their cores are required to be colinear, without the need of taking any care of the positioning of the whirling stress filaments, at the joint. The experimental curves shown in FIG. 9 show the very desirable results pertaining to the property of the invention, which favor the fiber's usefulness in a practical fiber-optic system.

Figure 10:
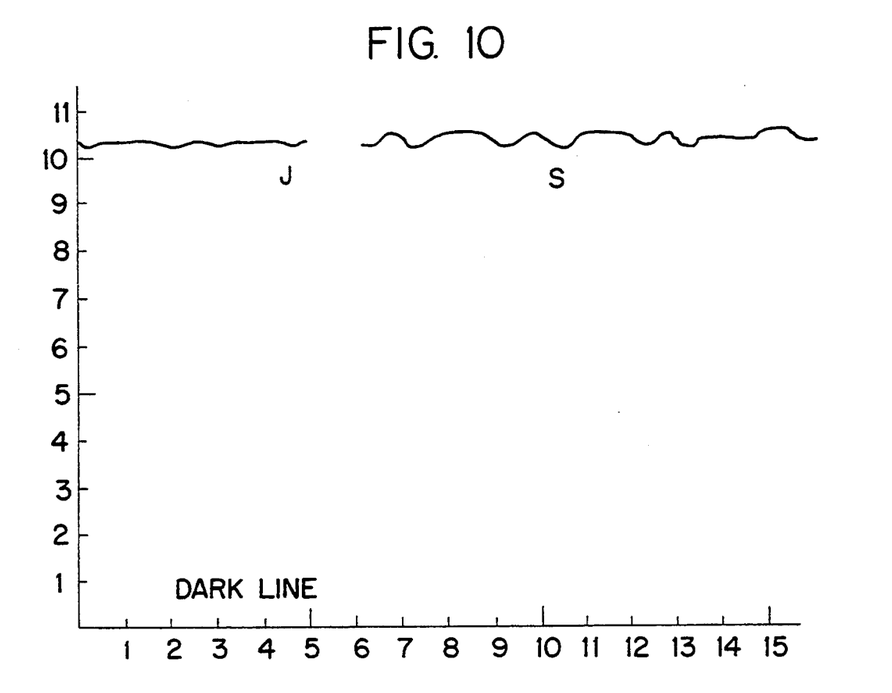
FIG. 10 is the experimental result showing that the circular SOP is maintained at a splice of two fiber-segments whose stress-filaments, not being required to be continuous at the joint, whirl around the core in opposite senses.

FIG. 10 provides further evidence regarding the simplicity and convenience in joining or splicing two segments of the invented SCREW fiber. Previous experimental curves (shown in FIG. 9) refer to joining or splicing two fiber segments whose stress-filaments whirl around the respective cores in the same sense. Experiments have also been conducted to join or splice two segments of SCREW fiber whose stress-filaments whirl around the respective cores in opposite senses, one clockwise and the other counter-clockwise. The two SOP curves in FIG. 10 are for this case. The letter J is for the SOP of the emerging light when two fibers with oppositely whirling stress-filaments are cascaded end-to-end, and the letter S, for the case when such two fibers are spliced together.

Figure 11:
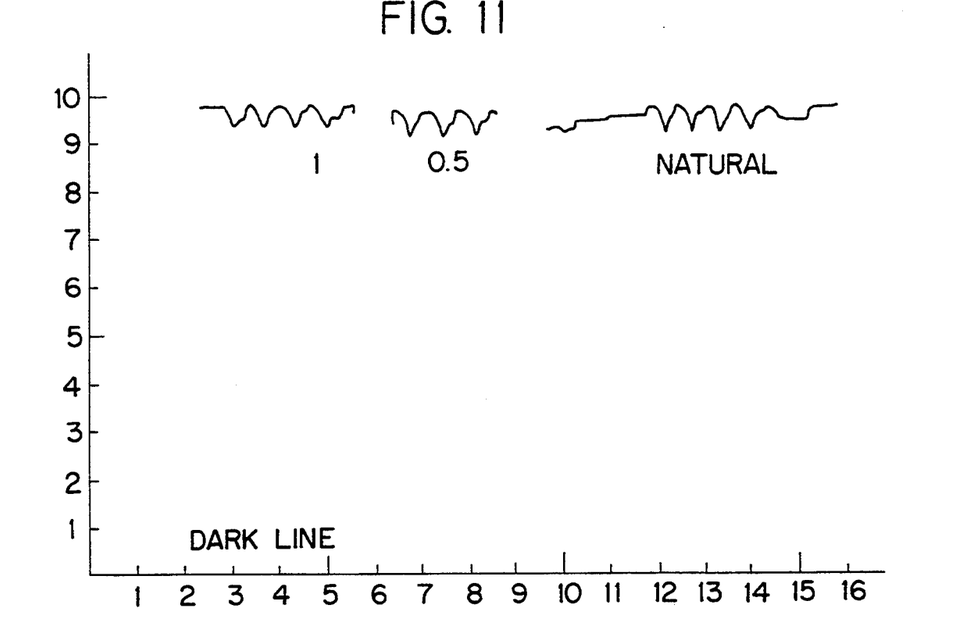
FIG. 11 shows the circular-polarization maintaining behavior or a fabricated fiber specimen when being slightly twisted.

FIG. 11 shows that the invented SCREW fiber is immune to afterward twisting of the fiber which transmits light of circular SOP. The numbers 1 and 0.5 under the two curves from the left indicate that the fiber specimen a few meters long is twisted one turn, and half a turn, respectively. The right-most curve shows the SOP of the emerging light when the fiber specimen is laid in a natural course without intentional twisting.

The above phenomenon shown by experiment, is drastically different from what will happen in a single-mode fiber of the conventional version, A theoretical analysis of the SOP of the emerging light from a twisted conventional fiber, for an incident light of circular SOP, shows that the SOP of the emerging light varies radically for slight twistings of the fiber, say, a few turns of twisting for a fiber a few meters long. In principle, an emerging circular SOP is only reached asymptotically for sufficiently strong twisting. (Whether or not the mechanical strength of fiber will be able to sustain such strong twisting is not of concern in a a theoretical study). Such SOP behaviors for slight and strong twistings are understandable by taking into account the residue intrinsic linear birefringence which always exists in a practical conventional fiber. For slight twisting of the fiber, the small twist-induced circular birefringence and the residue intrinsic linear birefringence are comparable in magnitude, causing the resulting SOP to vary radically in a complicated manner. Circular SOP is approached asymptotically only when the applied strong twisting produces a circular birefringence far exceeding the residue intrinsic linear birefringence.

Figure 12:
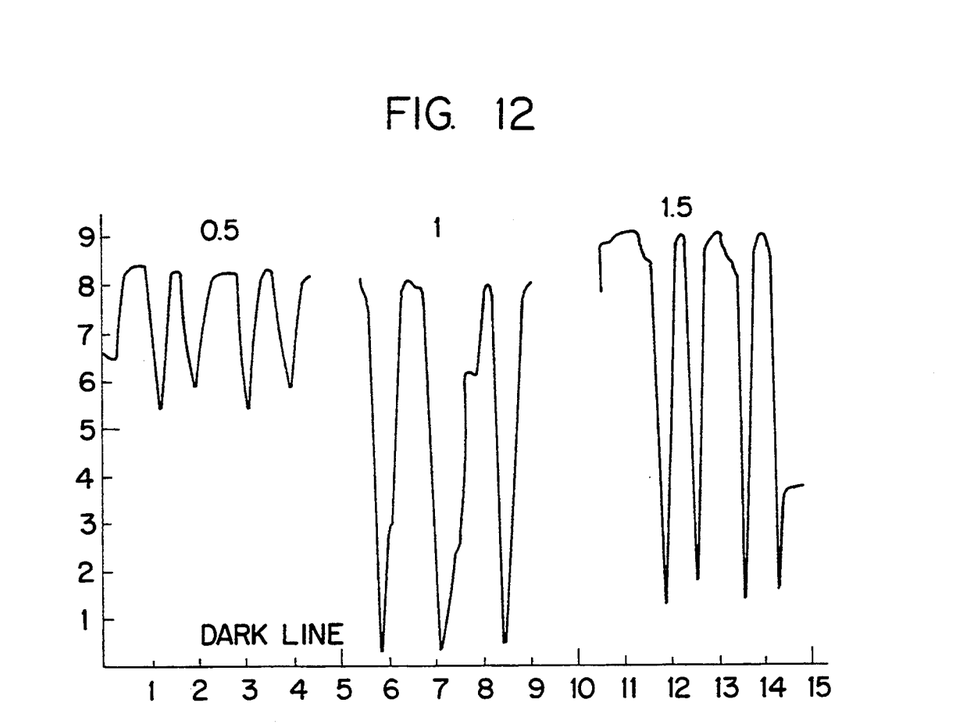
FIG. 12 shows the drastically pulsating characteristics of the SOP in a conventional fiber when being slightly twisted.

The experimental SOP curves for a conventional fiber under slight twistings are shown in FIG. 12, in which the numbers marked on the curves, 0.5, 1 and 1.5, indicate the numbers of twisting turns of a piece of conventional fiber several meters long. A comparison of FIGS. 11 and 12 reveals that the invented SCREW fiber ensures the transmission of a stable circular SOP under slight twistings of the fiber, a favorable feature not to be found in the fibers of the conventional version.

The present invention, called the SCREW fiber has now been fully disclosed as regards its operational principle, its fabrication methods, and its actual behaviors evidenced by the inventor's initial experiments on several fabricated specimens. Because of the unique advantageous features inherent in light transmission in circular SOP, the invented SCREW fiber is naturally an ideal light-wave transmission medium for a multitude of application areas.

One important application area concerns an all-fiber gyroscope. Central to the fiber-optic architecture concerned is the Sagnac loop onto which two beams are launched, separately and in counter-propagating directions. The use of linear polarization maintaining fiber, being the only kind of polarization maintaining fiber practically available until disclosure of the present invention, poses a "hard-nut" difficulty in splicing the terminals of the Sagnac loop with the rest of the fiber-optic circuitry, inasmuch as aligning of principal axes on both sides of the last joint cannot be aided by monitoring the power through the jointed end where two beams propagate in opposite directions. B. Culshaw, "Polarization phenomena in optical fiber Sagnac inerferometers", Proc. Digest of PIERS (Progress in Electromagnetics Research Symposium), sponsored by MIT, Cambridge, Jul. 4, 1030 (1991). Huang Hung-chia, "Passive polarization control in fiber optics", Proc. Digest of PIERS, sponsored by MIT, Cambridge, Jul. 4, AM 0950 (1991). The invented SCREW fiber, when used to structure an all-novel gyroscope architecture, will remove all of the said technical difficulties associated with linear-polarization maintaining fibers requiring accurate aligning not only of the cores, but also of the two pairs of stress-applying filaments at any joint of a practical fiber-optic system.

Figure 13:
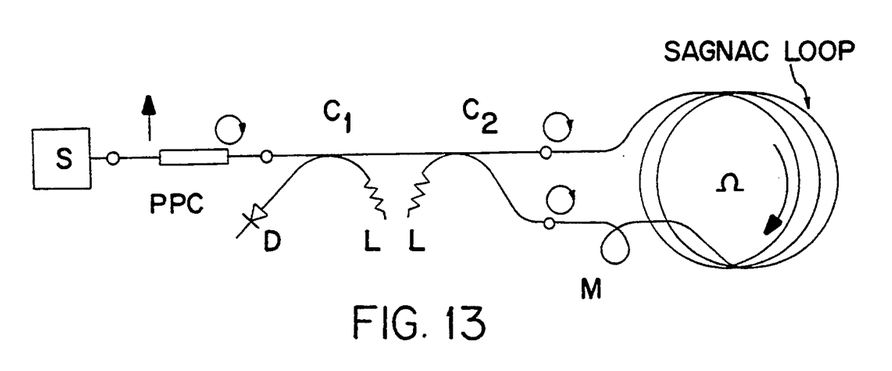
FIG. 13 is a fiber gyroscope architecture working on circularly polarized light with the aid of the circular-polarization maintaining fiber of the present invention.

A schematic diagram of the complete fiber-optic circuitry forming the novel gyroscope architecture is shown in FIG. 13. In the figure, is the source; D, the detector; $C_1$ and $C_2$ are two 3 dB couplers; each L is a matching termination; M is an on-line phase modulator, and $\Omega$ indicates rotation of the Sagnac loop. The last splicing of two fiber-ends to close the gyroscope fiber circuitry now poses no more difficulty. Nothing like principal axes aligning is required in the invented circular-polarization maintaining SCREW fiber, which actually does not have a preferred pair of coordinate axes, to be taken as principal axes, in its azimuthally symmetrical cross-sectional structure. For a closing of the fiber circuitry in FIG. 13, what is required is to splice the last two free fiber-ends by putting the respective cores collinearly, just as simple as splicing fibers of the conventional version. FIG. 13 includes a fiber element or device denoted by PPC (Passive Polarization Control), whose function is to transform a linear SOP of light from the source to a circular SOP of light to enter the fiber-optic circuitry. The PPC was a previous invention of the present inventor, and is the only fiber-device yet available which can be put into on-line use for the said polarization transformation. Huang Hung-chia, "Passive fiber-optic polarization control", U.S. Pat. No. 4,943,132 (July 1990). Huang Hung-chia, "Passive fiber-optic polarization control element", U.S. Pat. No. 5,096312 (March 1992).

The invented circular-polarization maintaining Screw fiber is in fact applicable to a variety of fiber interferometers and fiber sensors, of which the gyroscope or "rotation" sensor is one example only. Of particular interest is the use of the invention in structuring a sensor to sense the Faraday effect due to a magnetic field or current. In this application, a Sagnac loop made from the invented SCREW fiber does not rotate as in the case of rotation sensing, but the loop is so coiled that a magnetic field is directed along the fiber axis, whose Faraday effect on the counter-propagating beams of circular SOP is manifested in the interference pattern of the recombined circularly polarized beams.

Use of the invented SCREW fiber in coherent optical transmission is another attractive application area. For a coherent system consisting of short or medium lengths of transmission line, the invented SCREW fiber is immediately applicable. The capability of SCREW fiber to maintain a stable circular SOP of light ensures an unfailing matching of the signal light and light from a local source in a coherent receiver. In the short run, a very promising application of the invention is probably a coherent CATV. What is still unclear at the moment is whether or not it is feasible to employ the invented SCREW fiber at a long distance. An accurate answer to this question awaits more analytic and experimental data about the over-all transmission characteristics of the invented circular-polarization maintaining fiber in the later course of R&D. Not alone is the development of technology a deterministic factor for employment of a new invention. Perhaps, what is more important is the problem of cost-effectiveness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circular-polarization maintaining optical fiber comprising an on-axis core and one or more built-in stress-applying filaments which are positioned to originate a small intrinsic linear birefringence, and are all helically-coiled around the core to apply a resulting stress on the core in an azimuthally varying direction along the fiber length, thereby producing circular birefringence in the fiber.

2. The circular-polarization maintaining optical fiber according to claim 1, wherein the comprises an on-axis core and a single built-in stress-filament which is helically-coiled around the core.

3. The circular-polarization maintaining optical fiber according to claim 1, wherein the fiber comprises an on-axis core and two stress-filaments which are helically-coiled around the core, and are positioned so that a line passing through one filament and the core is perpendicular to a line passing through the second filament and the core, whereby the fiber in its unspun state has a small intrinsic linear birefringence.

4. The circular-polarization maintaining optical fiber according to claim 1, wherein the fiber comprises four stress-filaments helically-coiled around the core, wherein the stress-filaments are circumferentially equally spaced apart, and radially at equal distances from the core, whereby the fiber in its unspun state has a vanishingly small intrinsic linear birefringence.

5. A fiber-optic device capable of preserving circular-polarization of light, employing a circular-polarization maintaining optical fiber comprising a central core and one or more built-in stress-applying filaments helically-coiled around the central core, which thus apply a stress on the core in an azimuthally varying direction along the fiber length, thereby producing circular birefringence in the fiber.

6. A fiber-optic system capable of stably transmitting circular-polarization of light, employing a circular-polarization maintaining optical fiber comprising a central core, and one or more built-in stress-applying filaments helically-coiled around the central core, which thus apply a stress on the core in an azimuthally varying direction along the fiber length, thereby producing circular birefringence in the fiber.

7. A method of fabricating a circular-polarization maintaining optical fiber, comprising spinning a specialized preform while the fiber is being drawn, wherein said specialized preform comprises an on-axis core rod and one or more off-axis stress-rods which are positioned so that the originated intrinsic linear birefringence is small, and wherein the core-rod and the stress-rod or stress-rods are enclosed on-axis and off-axis, respectively, in a tubing filled with additional glass rods thereby shaping the over-all structure to become the desired preform.

8. A method of fabricating a circular-polarization maintaining optical fiber, comprising spinning a specialized preform while the fiber is being drawn, wherein said specialized preform comprises an on-axis core-rod and four off-axis stress-rods which are positioned so that the stress-rods are circumferentially equally spaced apart, and radially at equal distances from the core-rod, and so that the originated intrinsic linear birefringence is small.

9. A method of fabricating a circular-polarization maintaining optical fiber, comprising spinning a specialized preform while the fiber is being drawn, wherein said specialized preform comprises an on-axis core rod and one or more off-axis stress-rods which are positioned so that the originated intrinsic linear birefringence is small, and wherein the preform comprising the core-rod and the stress-rod or stress-rods is made by the MCVD (Modified Chemical Vapor Deposition) method supplemented by the technique of partial gas-etching.

10. A method of fabricating a circular-polarization maintaining optical fiber, comprising spinning a specialized preform while the fiber is being drawn, wherein said specialized preform comprises an on-axis core rod and one or more off-axis stress-rods which are positioned so that the originated intrinsic linear birefringence is small, and wherein the preform is made by burying the stress-rod or stress-rods in the preform by drilling fitting hollow cylinders in a single-mode fiber preform.

* * * * *